United States Patent
Zhang et al.

(10) Patent No.: US 8,404,128 B1
(45) Date of Patent: Mar. 26, 2013

(54) METHOD AND SYSTEM FOR PROVIDING A PERPENDICULAR MAGNETIC RECORDING HEAD

(75) Inventors: Hong Zhang, Fremont, CA (US); Ge Yi, Pleasanton, CA (US); Lei Wang, Fremont, CA (US); Dujiang Wan, Fremont, CA (US); Guanghong Luo, Fremont, CA (US); Xiaohai Xiang, Danville, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 806 days.

(21) Appl. No.: 12/391,095

(22) Filed: Feb. 23, 2009

(51) Int. Cl.
    *G11B 5/127* (2006.01)
(52) U.S. Cl. ... 216/22; 29/602.1; 29/603.01; 29/603.07; 29/603.13; 29/603.14; 29/603.15; 29/603.16; 29/603.18; 360/125.01; 360/125.02; 360/125.03; 360/125.33
(58) Field of Classification Search ............ 216/22; 29/603.01, 603.07, 603.13, 603.14, 603.15; 360/125.01, 125.02, 125.03
    See application file for complete search history.

(56) References Cited

U.S. PATENT DOCUMENTS

| | | | |
|---|---|---|---|
| 2004/0085674 A1* | 5/2004 | Han et al. | 360/126 |
| 2005/0024774 A1* | 2/2005 | Fontana et al. | 360/128 |
| 2005/0066517 A1* | 3/2005 | Bedell et al. | 29/603.13 |
| 2006/0044682 A1 | 3/2006 | Le et al. | |
| 2006/0262453 A1* | 11/2006 | Mochizuki et al. | 360/125 |
| 2008/0100959 A1* | 5/2008 | Feldbaum et al. | 360/110 |
| 2008/0110761 A1 | 5/2008 | Lam et al. | |
| 2008/0113090 A1 | 5/2008 | Lam et al. | |
| 2008/0144215 A1 | 6/2008 | Hsiao et al. | |
| 2008/0244896 A1* | 10/2008 | Bonhote et al. | 29/603.01 |

* cited by examiner

*Primary Examiner* — Lan Vinh
*Assistant Examiner* — David Kaufman (57) ABSTRACT

A method and system for providing a magnetic recording transducer having a pole are disclosed. The pole has side(s), a bottom, and a top wider than the bottom. The method and system include providing at least one side gap layer that covers the side(s) and the top of the pole. At least one sacrificial layer is provided on the side gap layer(s). The sacrificial layer(s) are wet etchable and cover the side gap layer(s). The magnetic recording transducer is planarized after the sacrificial layer(s) are provided. Thus, a portion of the side gap and sacrificial layer(s) is removed. A remaining portion of the sacrificial layer(s) is thus left. The method and system also include wet etching the sacrificial layer(s) to remove the remaining portion of the sacrificial layer(s). A wrap around shield is provided after the remaining portion of the sacrificial layer(s) is removed.

13 Claims, 7 Drawing Sheets

ABS View
FIG. 9

Side View
FIG. 10

METHOD AND SYSTEM FOR PROVIDING A PERPENDICULAR MAGNETIC RECORDING HEAD

BACKGROUND

Figure 1:
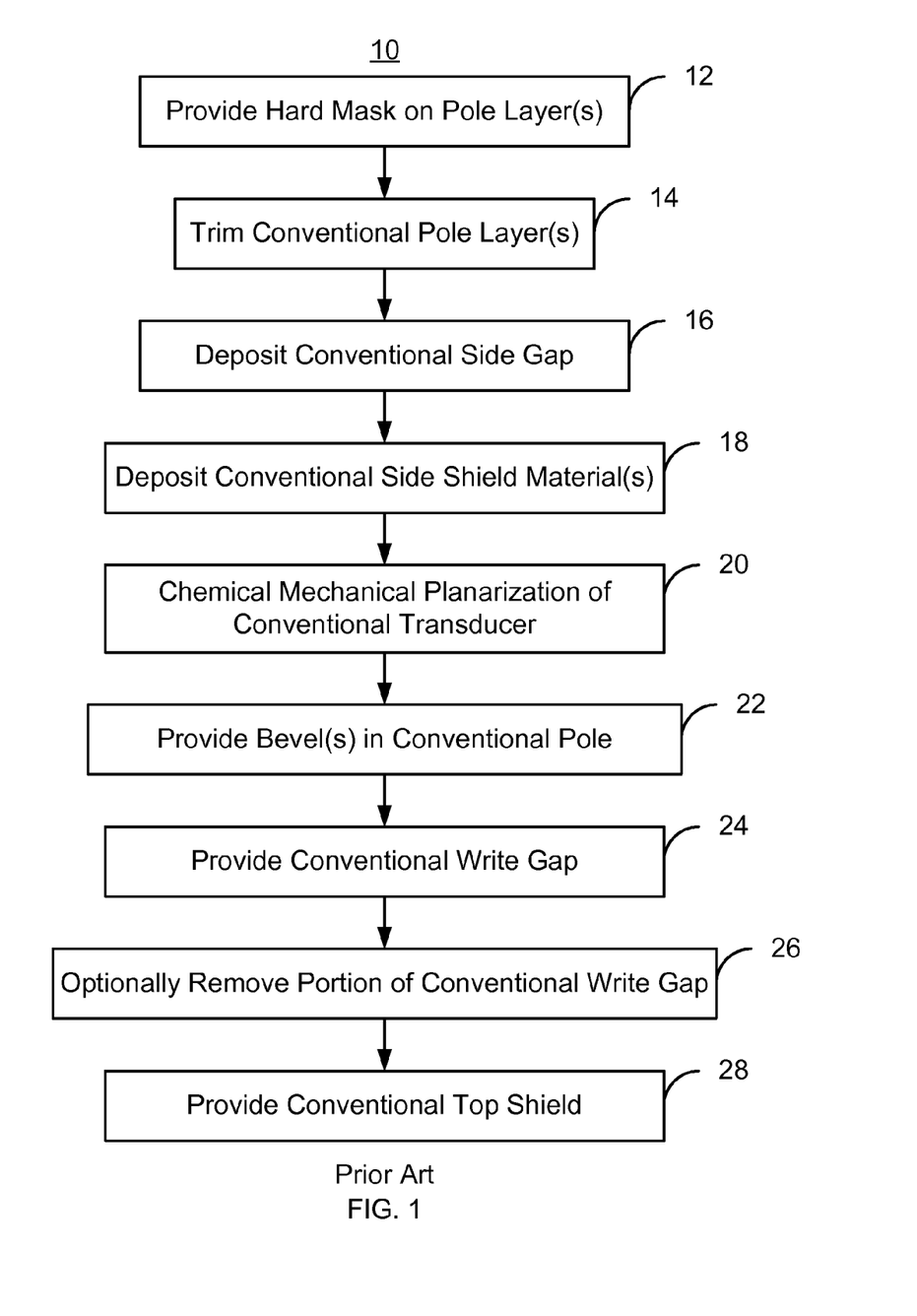
FIG. 1 is a flow chart depicting a conventional method for fabricating a PMR transducer.

FIG. 1 is a flow chart depicting a conventional method 10 for fabricating a conventional perpendicular magnetic recording (PMR) transducer. For simplicity, some steps are omitted. The conventional method 10 commences after the high moment layer(s) for the PMR pole are deposited, for example by plating. At least a hard mask is provided, via step 12. Step 12 may also include depositing other conventional layers, such as a chemical mechanical planarization (CMP) stop layer. The hard mask and other layers may be blanket deposited, then patterned using conventional photolithography. The pole layer(s) are then trimmed, via step 14. Step 14 is used to form the conventional PMR pole. The top, or trailing edge, of the conventional PMR pole is thus wider than the bottom of the conventional PMR pole.

Side gap material(s) may then be deposited, via step 16. Step 16 typically includes depositing a nonmagnetic layer, such as aluminum oxide. Side shield material(s) may then be deposited, via step 18. Step 18 may be used if side shields are desired for the conventional PMR transducer. A CMP is then performed, via step 20. The stop layer that might be provided in step 12 might be used to terminate the CMP.

Bevel(s) may also be provided in the conventional PMR pole, via step 22. If a top bevel is to be provided, step 22 may include removing a top portion of the ferromagnetic pole materials in the region that the air-bearing surface (ABS) is to be formed. As a result, the top surface of the conventional PMR pole near the ABS is lower than the yoke portion of the PMR pole. If step 22 is to be used to form a bottom bevel, the step 22 is typically performed earlier in the method 10, for example prior to step 12. In such a case, step 22 may be used to ensure that the topology of the layer(s) on which the conventional PMR pole is formed is higher in proximity to the ABS. Step 22 may include masking a portion of the underlayer(s) and refilling the layer(s) near the ABS. In such a case, this portion of step 22 is performed before steps 12 and 14. As a result, a bottom bevel may be formed.

The write gap may then be provided, via step 24. Step 24 may include depositing a thin nonmagnetic layer that covers at least the top of the pole near the ABS. A portion of the write gap may optionally be removed, via step 26. Part of the write gap may be removed if the side shields are desired to be electrically connected to a top shield, forming a wrap around shield. Step 26 would then typically include providing a mask that covers the pole and side gaps and removing the exposed portion of the write gap. If the top shield is desired to float, or be electrically unconnected to the side shields, then step 26 may be omitted. The conventional top shield may then be provided, via step 28. Fabrication of the conventional PMR transducer may then be completed.

Figure 2:
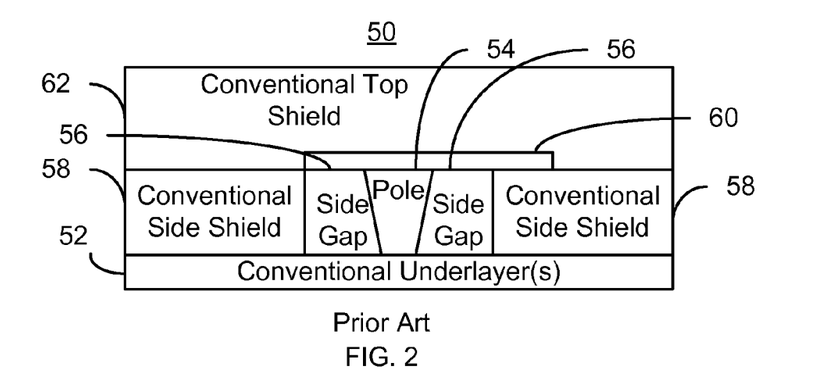
FIG. 2 is a diagram depicting a conventional PMR transducer.

FIG. 2 depicts a conventional PMR transducer 50 formed using the method 10. The conventional PMR transducer 50 includes a pole 54 formed on one or more conventional underlayers 52. Also shown are conventional side gaps 56, conventional side shields 58, conventional write gap 60, and conventional top shield 62. In the conventional PMR transducer 50, the conventional side shields 58 are electrically connected to the conventional top shield 62, to form a conventional wrap around shield.

Although the conventional method 10 may provide the conventional PMR transducer 50, there may be drawbacks. Misalignment may occur in, for example, step 26. More specifically, the mask used to cover the pole 54 during formation of the conventional write gap 60 may not be centered on the pole 54. As a result, there may be more stray edge fields during use of the conventional PMR transducer. If portions of the write gap 58 are not removed, the conventional top shield 60 may float. Such a conventional PMR transducer may also have higher edge stray fields. Consequently, the conventional PMR transducer 50 may be subject to erasure issues, for example erasure of side tracks. Performance of the conventional PMR transducer 50 may thus be compromised.

Accordingly, what is needed is an improved method for fabricating a PMR transducer.

SUMMARY

A method and system for providing a magnetic recording transducer having a pole are disclosed. The pole has at least one side, a bottom, and a top wider than the bottom. The method and system include providing at least one side gap layer that covers the side(s) and the top of the pole. The method and system also include providing at least one sacrificial layer on the side gap layer(s). The at least one sacrificial layer is wet etchable and covers the side gap layer(s). The magnetic recording transducer is planarized after the sacrificial layer(s) are provided. Thus, a portion of the side gap and sacrificial layer(s) is removed. A remaining portion of the sacrificial layer(s) is thus left. The method and system also include wet etching the sacrificial layer(s) to remove the remaining portion of the sacrificial layer(s). A wrap around shield is provided after the remaining portion of the sacrificial layer(s) is removed.

DETAILED DESCRIPTION OF THE PREFERRED EMBODIMENTS

Figure 3:
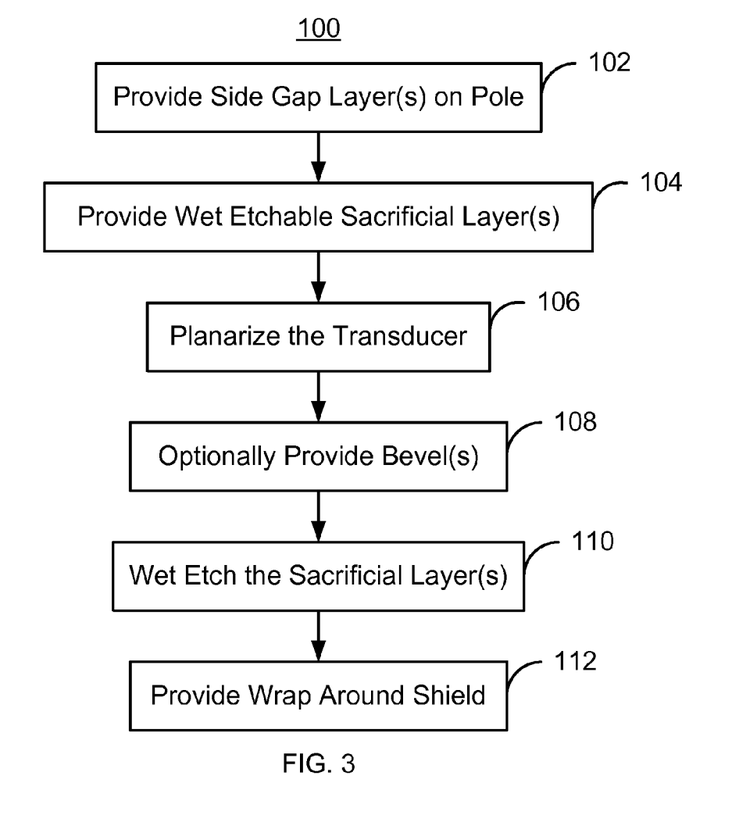
FIG. 3 is a flow chart depicting an exemplary embodiment of a method for fabricating a PMR transducer.

FIG. 3 is a flow chart depicting an exemplary embodiment of a method 100 for fabricating a transducer. The method 100 is described in the context of a PMR transducer, though other transducers might be so fabricated. For simplicity, some steps may be omitted. The PMR transducer being fabricated may be part of a merged head that also includes a read head (not shown) and resides on a slider (not shown) in a disk drive. The method 100 also may commence after formation of other portions of the PMR transducer. The method 100 is also described in the context of providing a single PMR pole and its associated structures in a single magnetic recording transducer. However, the method 100 may be used to fabricate multiple transducers at substantially the same time. The method 100 and system are also described in the context of particular layers. However, in some embodiments, such layers may include multiple sub-layers.

In one embodiment, the method 100 commences after formation of the underlayer(s) on which the PMR pole is to reside as well as the PMR pole itself. Formation of the PMR pole may include blanket deposition of the layer(s) for the PMR pole, for example by plating the high moment magnetic material(s). Such materials may include alloys and/or multilayers. A mask structure may then be provided on the pole layers. The mask structure may include a hard planarization stop layer, a hard mask layer, and a bottom antireflective coating (BARC) layer. The mask structure may be formed using photoresist mask(s) and photolithography. The PMR pole may then be formed by trimming the pole layer(s) with the mask structure in place. The pole layer(s) may be trimmed such that a trapezoidal PMR pole having a top wider than the bottom is formed. The top of the PMR pole may correspond to the trailing edge of the PMR pole during writing.

One or more side gap layers are provided, via step 102. The material(s) provided in step 102 are nonmagnetic and may be insulating. In some embodiments, step 102 includes depositing a layer of aluminum oxide. The side gap materials may be blanket deposited in the region of the PMR pole. Thus, the sides and the top of the PMR pole are covered by the side gap layer(s).

At least one sacrificial layer is provided on the side gap layer(s), via step 104. The sacrificial layer(s) are wet etchable and cover the side gap layer(s). Step 104 may include depositing a seed layer, then depositing the sacrificial layer, for example by plating. The material(s) for the sacrificial layer(s) deposited in step 104 may include one or more of NiFe, CoFe, CoNiFe, Ni, Cu, and Fe. In general, the material(s) used for the sacrificial layer(s) are desired to be wet etchable and able to be removed in a planarization in a similar manner to the side gap layer(s). In some embodiments, the material(s) are also desired to be plateable.

The magnetic recording transducer is planarized, via step 106. For example, a CMP may be performed in step 106. As a result, the top surface of the PMR transducer may be substantially flat, at least in the region of the PMR pole. As a result, a portion of the sacrificial layer(s) and a portion of the side gap layer(s) may be removed. The planarization in step 106 may be terminated at the CMP stop layer in the mask structure described above. In another embodiment, the planarization may be terminated in another manner.

Bevel(s) may optionally be provided, via step 108. Step 108 may include exposing the top of the PMR pole, if not already exposed. If a top bevel is to be provided, a portion of the PMR pole in the region close to the location where the ABS is to be formed (ABS location) is removed. To do so, another portion of the PMR pole distal to the ABS location is covered by a mask. The top of the exposed portion of the PMR pole is then removed, for example via ion milling. Thus a top bevel may be formed. If a bottom bevel is to be formed, the topology under the PMR pole is prepared such that the layer(s) under the pole are higher near the ABS location. In another embodiment, another mechanism may be used to form the bottom bevel.

The sacrificial layer(s) are wet etched, via step 110. As a result, any portion of the sacrificial layer(s) remaining is removed. Consequently, the side gap layer(s) are exposed. In some embodiments, step 110 also includes providing a mask that covers the PMR pole. In some such embodiments, at least a portion of the side gap layer(s) is also covered. After the mask is provided, the sacrificial layer(s) may be wet etched.

A wrap around shield may be provided, via step 112. In some embodiments, step 112 includes depositing a seed layer, then plating the wrap around shield. Step 112 may be performed after a write gap has been formed. In embodiments in which the write gap is metallic and has a sufficiently high conductivity, the seed layer may be omitted. Instead, the shield may be plated directly on the write gap. In other embodiments, for example where the write gap is an insulator, the seed layer may be used. Fabrication of the PMR transducer may then be completed.

Using the method 100, a PMR transducer may be formed. More specifically, a wrap around shield may be formed. Further, the wrap around shield may be provided without requiring masking and removal of a portion of the write gap. Consequently, misalignments of the write gap and the attendant increases in stray side fields may be reduced or eliminated. Using the method 100, therefore, a PMR transducer having improved performance may be fabricated.

Figure 4:
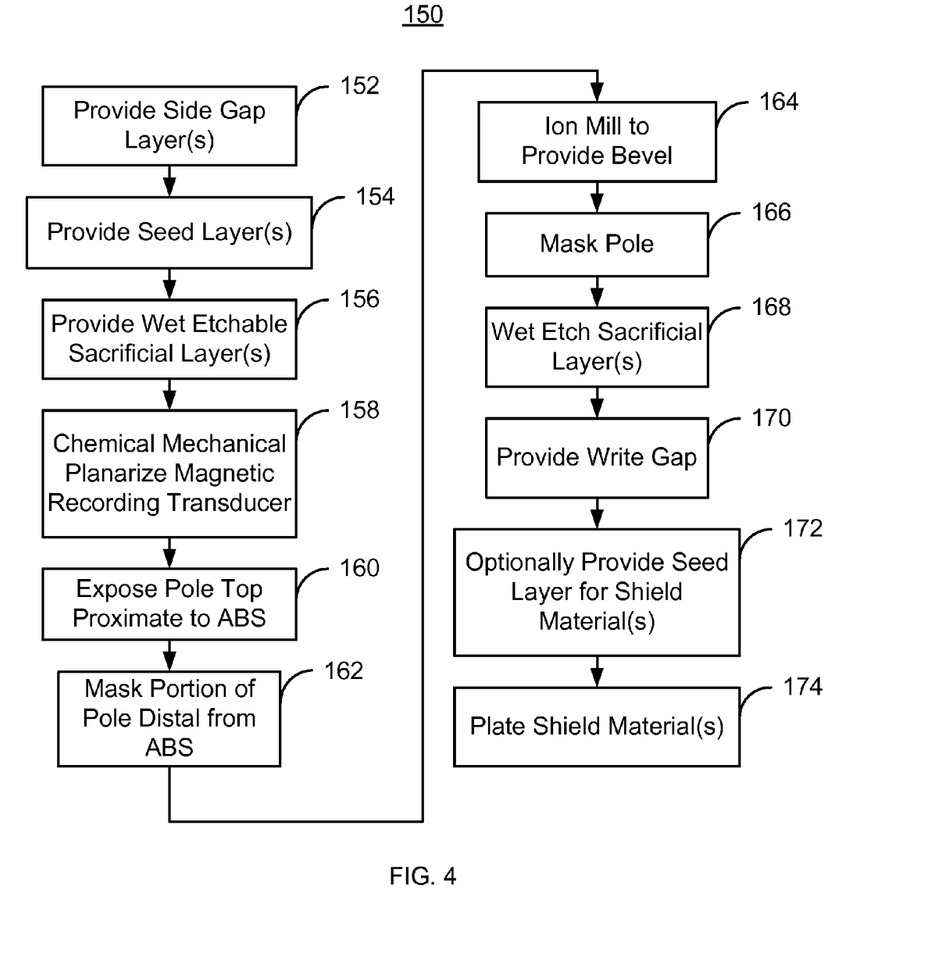
FIG. 4 is a flow chart depicting another exemplary embodiment of a method for fabricating a PMR transducer.

FIG. 4 is a flow chart depicting another exemplary embodiment of a method 150 for fabricating a PMR transducer. For simplicity, some steps may be omitted. FIGS. 5-13 are diagrams depicting an exemplary embodiment of a PMR transducer 200 as viewed from the ABS during fabrication. For clarity, FIGS. 5-13 are not to scale. Referring to FIGS. 4-13, the method 150 is described in the context of the PMR transducer 200. However, the method 150 may be used to form another device (not shown). The PMR transducer 200 being fabricated may be part of a merged head that also includes a read head (not shown) and resides on a slider (not shown) in a disk drive. The method 150 also may commence after formation of other portions of the PMR transducer 200. The method 150 is also described in the context of providing a single PMR transducer. However, the method 150 may be used to fabricate multiple transducers at substantially the same time. The method 150 and device 200 are also described in the context of particular layers. However, in some embodiments, such layers may include multiple sublayers.

Figure 5:
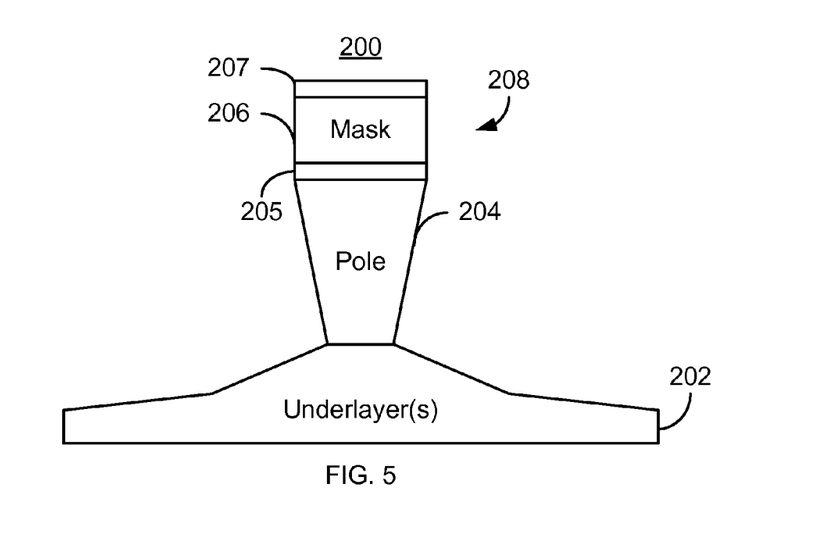
FIGS. 5-13 are diagrams depicting an exemplary embodiment of a perpendicular magnetic recording transducer during fabrication.

In one embodiment, the method 150 commences after formation of the underlayer(s) on which the PMR pole is to reside as well as the PMR pole itself. Formation of the PMR pole may include blanket deposition of the layer(s) for the PMR pole, for example by plating the high moment magnetic material(s). Such materials may include alloys and/or multilayers. A mask structure may then be provided on the pole layers. The PMR pole may then be formed by trimming the pole layer(s) with the mask structure in place. The pole layer(s) may be trimmed such that a trapezoidal PMR pole having a top wider than the bottom is formed. The top of the PMR pole may correspond to the trailing edge of the PMR pole during writing. For example, FIG. 5 depicts one embodiment of the transducer 200 before the method 150 commences. The PMR transducer 200 includes one or more underlayer(s) 202, pole 204, and mask structure 208. The mask structure 208 shown includes a CMP stop layer 205, a hard mask 206, and a bottom BARC layer 207. The mask structure 208 may be formed using photolithography. The PMR pole 204 is fabricated by trimming magnetic pole layer(s) with the mask structure 208 in place.

Figure 6:
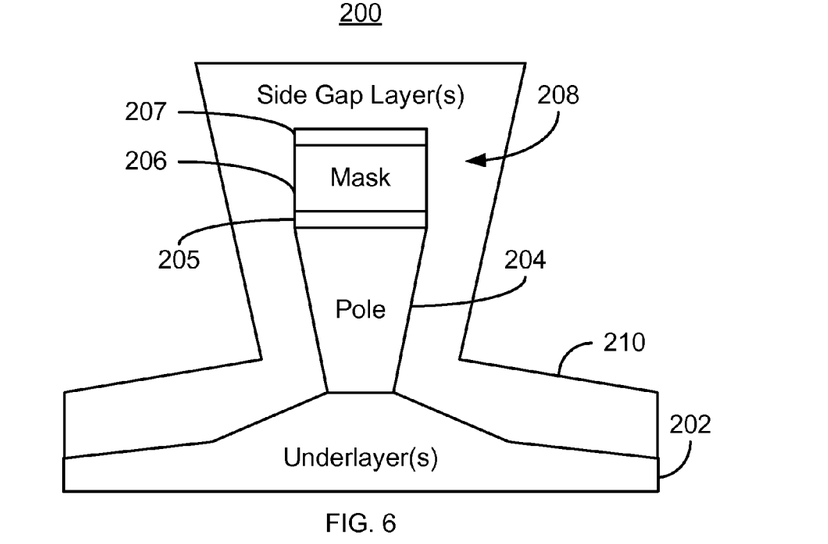

Side gap layer(s) are provided on the pole 204, via step 152. The side gap layer(s) are nonmagnetic and, in some embodiments, insulating. In some embodiments, step 152 includes depositing an aluminum oxide layer. FIG. 6 depicts the transducer 200 after step 152 is performed. Thus, side gap layer(s) 210 are shown. In some embodiments, the side gap layer(s) 210 cover the pole 204.

One or more seed layers are provided on the side gap layer(s), via step 154. The seed layers may be used to allow plating of the sacrificial layers, described below, on the aluminum oxide side gap layer(s). Like the sacrificial layer(s), the seed layer is desired to be wet etchable.

Figure 7:
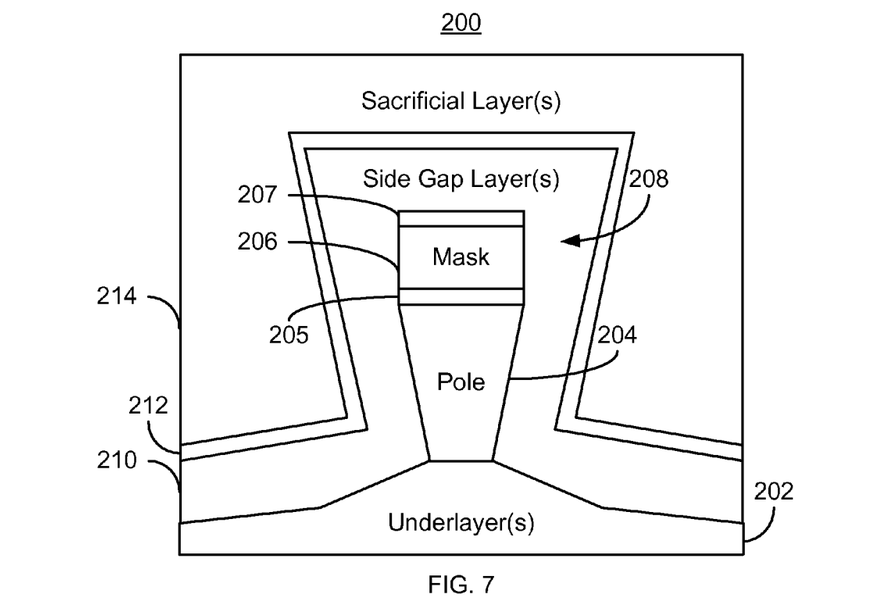

At least one sacrificial layer is plated, via step 156. The sacrificial layer(s) are plated on the seed layer(s) and thus also on the side gap layer(s). The sacrificial layer(s) are also wet etchable and cover the side gap layer(s). The material(s) for the sacrificial layer(s) plated in step 156 may include one or more of NiFe, CoFe, CoNiFe, Ni, Cu, and Fe. However, in other embodiments, other materials may be used. In general, the material(s) used for the sacrificial layer(s) are desired to be plateable, wet etchable and able to be removed in a planarization at a similar rate to the side gap layer(s). FIG. 7 depicts the transducer 200 after the sacrificial layer(s) are deposited. Thus, an optional seed layer 212 and sacrificial layers 214 are shown.

Figure 8:
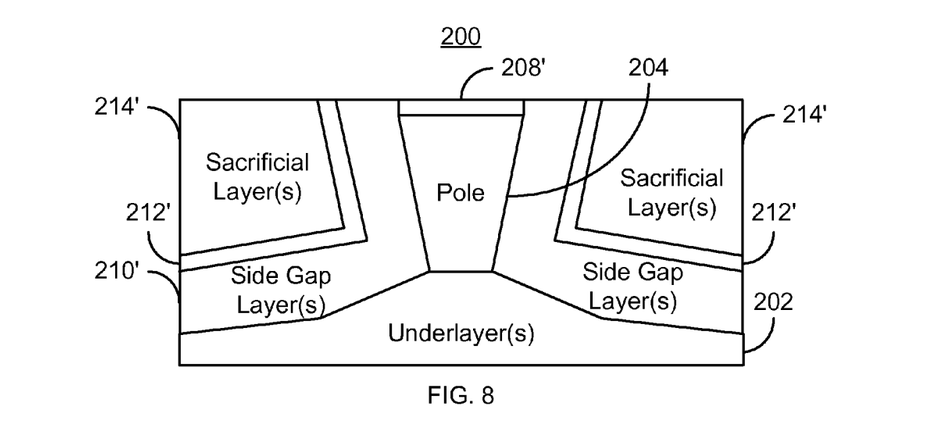

The magnetic recording transducer is planarized using a CMP, at least in the region of the PMR pole 204, via step 158. FIG. 8 depicts the transducer 200 after step 158 is performed. As a result of the CMP, the top surface of the PMR transducer 200 may be substantially flat. Further portions of the sacrificial layer(s) 214, seed layer(s) 212 and side gap 210 are removed. Consequently, remaining portions of the sacrificial layer(s) 214', seed layers 212', and side gap layer(s) 210' are shown. A portion of the mask structure 208 has also been removed, leaving mask structure 208' which may correspond to the CMP stop 205. Thus, the CMP of step 158 may be terminated at the CMP stop layer (shown as remaining portions of mask structure 208' in FIG. 8). In other embodiments, the planarization may be terminated in another manner.

The top of the pole 204 proximate to the ABS is exposed, via step 160. In some embodiments, the entire top of the pole 204 is exposed in step 160. Step 160 may include removing the remaining portion of the mask 208', for example through a reactive ion etch.

Figure 9:
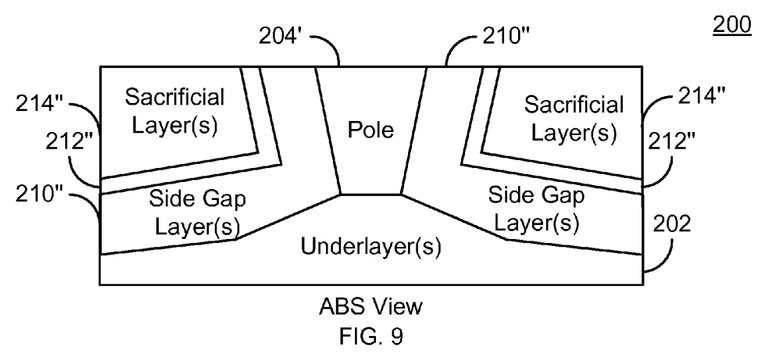
Figure 10:
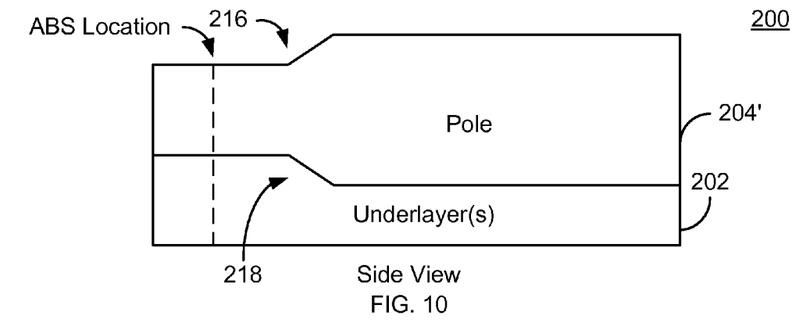

Bevel(s) may also optionally be provided. A bottom bevel may be provided through appropriate formation of the topology underlying the pole 204, prior to the method 100 commencing. A top bevel may also be provided, for example through steps 162-164, described below. A mask that covers the portion of the pole 204 distal to the ABS location is provided, via step 162. The top of the exposed portion of the pole 204, proximate to the ABS, is then removed, via step 164. Step 164 may be performed via ion milling. The ion milling may also be performed at an angle from normal to the surface of the transducer 200. Thus, a bevel is formed in the top of the pole 200. Once the top bevel is formed, the mask may be removed. FIGS. 9-10 depict the transducer after step 164 is performed. FIG. 9 depicts an ABS view, while FIG. 10 depicts a side view. The pole 204' is shown in FIG. 9 as having a lower height because a portion of the pole has been removed proximate to the ABS location. Thus, the top bevel 216 is formed. In the embodiment shown, the pole 204' also includes a bottom bevel 218. However, the bottom bevel 216 may be omitted. The top bevel 216 may be a trailing edge bevel, while the bottom bevel 218 may be a leading edge bevel. In addition, the heights of the side gap layers 210", the seed layers 212" and the sacrificial layers 214" may be reduced near the ABS. The ABS location shown in FIG. 10 corresponds to the location of the ABS once lapping and other fabrication of the transducer 200 is completed. In another embodiment, the ABS location may have been set prior to step 164. In such an embodiment, the ABS location may be at the end of the pole 204'.

The pole 204' is masked, via step 166. The mask covers the top of the pole but exposes at least part of the remaining sacrificial layer(s) 214". Thus, the mask is configured to prevent a wet etchant from reaching the pole 204', but allows the etchant to reach the sacrificial layer(s) 214".

Figure 11:
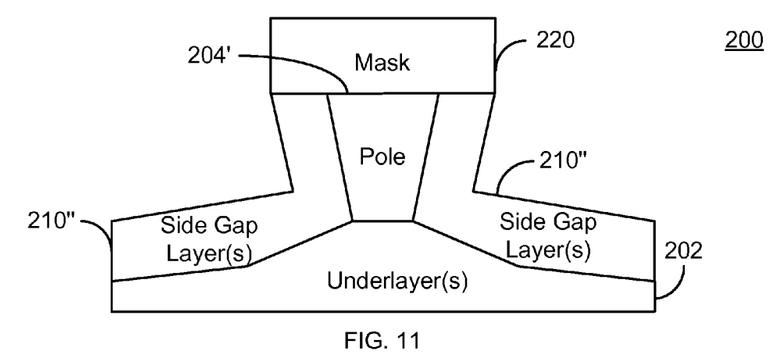

The sacrificial layer(s) 214" are wet etched, via step 168. As a result, any portion of the sacrificial layer(s) 214" remaining are removed. In addition, the seed layers 212" may be configured to be removed by the wet etchant. Consequently, the side gap layer(s) 210" are exposed. FIG. 11 depicts the transducer 200 after step 168 is performed. Thus, the mask 220 is shown. The side gap layer(s) 210" have been exposed. In the embodiment shown, the mask 220 extends to the outer edges of the side gap layer(s) 210". However, in other embodiments, the mask may not extend as far as the outer edges of the side gap layer(s) 210" or may extend farther than the outer edges of the side gap layer(s). In such embodiments, however, the mask 220 still completely covers the pole 204' so that the etchant used does not attack the pole 204'.

Figure 12:
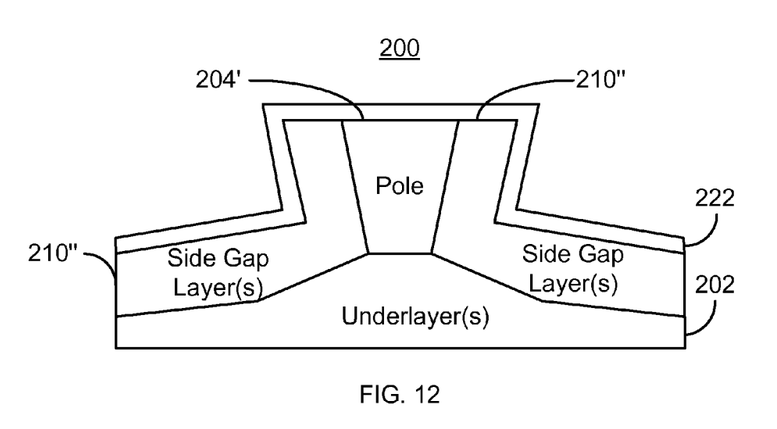

A write gap is deposited after the sacrificial layer(s) 214" are removed, via step 170. The write gap used is nonmagnetic and might, for example, be metallic or insulating. FIG. 12 depicts the transducer 200 after step 170 is performed. Thus, a write gap 222 is shown. The write gap 222 resides on the top of the pole 204' and a portion of the side gap layer(s) 210". In the embodiment shown, the write gap 222 completely covers the side gap layer(s) 210". More specifically, the write gap 222 may be self-aligned. As a result, the write gap 222 extends substantially evenly on both sides of the pole 204', and is aligned to the pole 204' without additional processing.

A seed layer may be optionally provided, via step 172. The seed layer may be used for a wrap around shield that is desired to be plated. Where the write gap 222 is metallic and/or has a sufficiently high conductivity that the material used for the shields may be plated or otherwise deposited on the write gap 222, a separate seed layer might be omitted. If the seed layer is nonmagnetic, it may be functionally part of the write gap. If the seed layer is magnetic, then the seed layer might be considered part of the shield.

Figure 13:
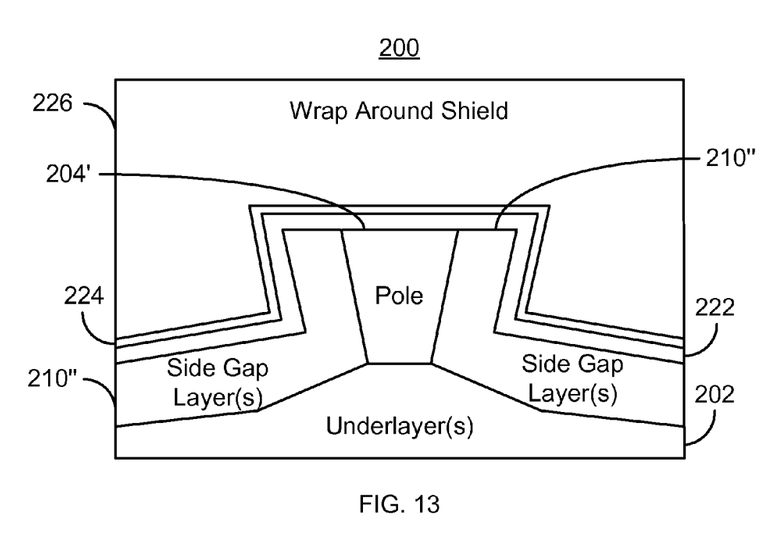

A wrap around shield may be provided, via step 174. In some embodiments, step 174 includes plating the wrap around shield. Fabrication of the PMR transducer may then be completed. FIG. 13 depicts the transducer 200 after step 174 is performed. Thus, a wrap around shield 226 is shown. The shield 226 may be made of a high moment magnetic material.

Thus, using the method 150, the PMR transducer 200 may be formed. More specifically, a wrap around shield may 226 over a self-aligned write gap 222 may be formed. Consequently, misalignments of the write gap 222 and the attendant increases in stray side fields may be reduced or eliminated. Using the method 150, therefore, the transducer 200 having improved performance may be fabricated.

We claim:

1. A method for providing a magnetic recording transducer having a pole on an underlayer, the pole including at least one side, a bottom, and a top wider than the bottom, the method comprising:
providing at least one side gap layer, the at least one side gap layer covering the at least one side and the top of the pole, a first portion of the at least one side gap layer covering a portion of the underlayer, a second portion of the at least one side gap layer covering the at least one side of the pole, the first portion being distinct from the second portion and not residing directly under the second portion of the at least one side gap layer;
providing at least one sacrificial layer on the at least one side gap layer, the at least one sacrificial layer being wet etchable and covering the at least one side gap layer including the first portion of the side gap layer;
planarizing the magnetic recording transducer after the at least one sacrificial layer is provided, a third portion of the at least one side gap layer being removed, a portion of the at least one sacrificial layer being removed to leave a remaining portion of the at least one sacrificial layer;

providing a mask covering the pole and exposing at least part of the remaining portion of the at least one sacrificial layer after the step of planarizing the magnetic recording transducer;

wet etching the at least one sacrificial layer to remove the remaining portion of the at least one sacrificial layer thereby exposing at least the first portion of the at least one side gap layer; and providing a wrap around shield after the remaining portion of the at least one sacrificial layer is removed.

2. The method of claim 1 wherein the step of providing the at least one sacrificial layer further includes:

plating the at least one sacrificial layer.

3. The method of claim 2 wherein the step of plating the at least one sacrificial layer further includes:

plating at least one of NiFe, CoFe, CoNiFe, Ni, Cu, and Fe.

4. The method of claim 1 further comprising:

providing a write gap after the remaining portion of the at least one sacrificial layer is removed.

5. The method of claim 4 wherein the write gap is a metal write gap.

6. The method of claim 4 wherein the write gap is an insulator.

7. The method of claim 6 further comprising:

providing a seed layer on the write gap, the seed layer being configured for the wrap around shield.

8. The method of claim 1 wherein the step of planarizing the magnetic transducer further includes:

chemical mechanical planarizing the magnetic recording transducer; and exposing the top of the pole.

9. The method of claim 1 further comprising:

providing a bevel in the top of the pole.

10. The method of claim 9 wherein the pole includes an air-bearing surface (ABS) region and wherein step of forming the bevel further includes:

providing a mask distal to the ABS region; and removing a portion of the top of the pole proximate to the ABS region.

11. The method of claim 10 wherein the step of removing the portion of the top of the pole further includes:

ion milling the portion of the top of the pole at a nonzero angle from normal to the top of the pole.

12. The method of claim 9 wherein the bevel is a trailing edge bevel.

13. A method for providing a magnetic recording transducer having a pole on an underlayer, the pole including at least one side, a bottom, and a top wider than the bottom, the method comprising:

providing at least one side gap layer, the at least one side gap layer covering the at least one side and the top of the pole, a first portion of the at least one side gap layer covering a portion of the underlayer, a second portion of the at least one side gap layer covering the at least one side of the pole, the first portion being distinct from the second portion and not residing directly under the second portion of the at least one side gap layer;

plating at least one sacrificial layer on the at least one side gap layer, the at least one sacrificial layer being wet etchable, covering the at least one side gap layer including the first portion of the at least one side gap layer, and including at least one of NiFe, CoFe, CoNiFe, Ni, Cu, and Fe;

chemical mechanical planarizing the magnetic recording transducer, a third portion of the at least one side gap layer being removed, a portion of the at least one sacrificial layer being removed to leave a remaining portion of the at least one sacrificial layer;

exposing at least a portion of the top of the pole;

removing the portion of the top of the pole, thereby providing a bevel in the top of the pole;

providing a mask covering the top of the pole and exposing the remaining portion of the at least one sacrificial layer after the step of removing the to portion of the pole;

wet etching the at least one sacrificial layer without the pole being exposed to the wet etching to remove the sacrificial layer and expose at least the first portion of the at least one side gap layer;

providing a write gap after the at least one sacrificial layer is removed, the write gap residing on the top of the pole and a portion of the at least one side gap layer; and providing a wrap around shield after the at least one sacrificial layer is removed.

* * * * *